(12) United States Patent
Chadwell

(10) Patent No.: US 8,371,120 B2
(45) Date of Patent: Feb. 12, 2013

(54) HCCI COMBUSTION TIMING CONTROL WITH DECOUPLED CONTROL OF IN-CYLINDER AIR/EGR MASS AND OXYGEN CONCENTRATION

(75) Inventor: Christopher James Chadwell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 652 days.

(21) Appl. No.: 12/014,589

(22) Filed: Jan. 15, 2008

(65) Prior Publication Data

US 2009/0178405 A1 Jul. 16, 2009

(51) Int. Cl.
*F02B 33/44* (2006.01)
*F02B 37/00* (2006.01)
*F02B 37/10* (2006.01)
*F02B 37/12* (2006.01)
*F02B 37/013* (2006.01)

(52) U.S. Cl. ........ 60/605.2; 60/605.1; 60/611; 123/435; 123/564

(58) Field of Classification Search .................... 60/611, 60/605.2, 612, 605.1; 123/561, 562, 564; F02B 37/00, 37/10, 37/12, 37/013; F02M 25/07
See application file for complete search history.

(56) References Cited

U.S. PATENT DOCUMENTS

| | | | | |
|---|---|---|---|---|
| 4,515,136 A | * | 5/1985 | Cholvin et al. ............... | 123/564 |
| 4,903,488 A | * | 2/1990 | Shibata ........................ | 60/612 |
| 5,427,079 A | * | 6/1995 | Andrepont et al. ........... | 123/561 |
| 6,055,967 A | * | 5/2000 | Miyagi et al. ................ | 123/564 |
| 6,112,523 A | * | 9/2000 | Kamo et al. .................. | 60/612 |
| 6,343,473 B1 | * | 2/2002 | Kanesaka ..................... | 60/609 |
| 6,354,268 B1 | * | 3/2002 | Beck et al. ................... | 123/435 |
| 6,463,907 B1 | | 10/2002 | Hiltner ......................... | 123/304 |
| 6,675,579 B1 | * | 1/2004 | Yang ............................ | 60/605.2 |
| 6,701,710 B1 | * | 3/2004 | Ahrens et al. ............... | 60/605.2 |
| 6,983,597 B2 | * | 1/2006 | Wild et al. ................... | 60/611 |
| 7,021,058 B2 | * | 4/2006 | Scheinert ..................... | 60/611 |
| 7,080,511 B1 | * | 7/2006 | Bolton et al. ................. | 60/611 |
| 7,128,063 B2 | | 10/2006 | Kang ........................... | 123/568.14 |
| 7,237,532 B2 | | 7/2007 | Gray, Jr. ....................... | 123/435 |
| 7,530,229 B2 | * | 5/2009 | Akita ........................... | 60/605.2 |
| 7,654,246 B2 | * | 2/2010 | Wang et al. .................. | 123/568.11 |
| 7,757,549 B2 | * | 7/2010 | Andreae et al. ............. | 73/114.77 |
| 8,141,361 B2 | * | 3/2012 | Andersen ..................... | 60/611 |
| 2003/0000507 A1 | * | 1/2003 | Kobayashi et al. .......... | 60/605.2 |

(Continued)

FOREIGN PATENT DOCUMENTS

| | | | | |
|---|---|---|---|---|
| JP | 57212331 A | * | 12/1982 | |
| JP | 2000213384 A | * | 8/2000 | |
| JP | 2001082259 A | * | 3/2001 | |
| JP | 2007263040 A | * | 10/2007 | |

(Continued)

*Primary Examiner* — Thai Ba Trieu
(74) *Attorney, Agent, or Firm* — Chowdhury & Georgakis PC; Ann C Livingston

(57) ABSTRACT

A method of controlling homogenous charge compression ignition (HCCI) combustion timing and pressure rise rate. A constant volume air pump, such as a supercharger, is equipped to provide a variable amount of fresh air to a turbocharger. The also turbocharger drives a high pressure exhaust gas recirculation (EGR) loop. The fresh air intake and the EGR ratio are independently controlled. This combination of hardware allows for good control of combustion timing by providing for EGR variations without undue effect from varying oxygen concentration. Additionally, by adjusting the EGR ratio, the pressure rise rate during combustion can be controlled to reduce combustion noise.

7 Claims, 4 Drawing Sheets

U.S. PATENT DOCUMENTS

2008/0034751 A1* 2/2008 Jorgensen .................. 60/605.2
2008/0208432 A1* 8/2008 Hu .............................. 701/103
2009/0077968 A1* 3/2009 Sun ............................. 60/605.2
2012/0285165 A1* 11/2012 Han et al. ................... 60/605.2

FOREIGN PATENT DOCUMENTS

WO    WO 9807973 A1 * 2/1998
WO    WO 2005062194 A1 * 7/2005

* cited by examiner

HCCI COMBUSTION TIMING CONTROL WITH DECOUPLED CONTROL OF IN-CYLINDER AIR/EGR MASS AND OXYGEN CONCENTRATION

TECHNICAL FIELD OF THE INVENTION

This invention relates to internal combustion engines, and more particularly to an improved system and method for controlling HCCI combustion timing.

BACKGROUND OF THE INVENTION

Homogeneous Charge Compression Ignition (HCCI) is a form of internal combustion in which well-mixed fuel and oxidizer (typically air) are compressed to the point of auto-ignition. As in other forms of combustion, this exothermic reaction releases chemical energy into a form that can be translated by an engine into work and heat.

HCCI combustion has characteristics of two other and more popular forms of combustion used in internal combustion engines: homogeneous charge spark ignition (gasoline engines) and stratified charge compression ignition (diesel engines). As in homogeneous charge spark ignition, the fuel and air are mixed together. However, rather than using an electric discharge to ignite a portion of the mixture, compression is used to raise the pressure and temperature of the mixture until the entire mixture reacts spontaneously. In comparison, stratified charge compression ignition also relies on the temperature and pressure increase resulting from compression, but combustion occurs at the boundary of fuel-air mixing, caused by an injection event to initiate the combustion.

In an HHCI engine, because there is no direct initiator of combustion, HCCI combustion is inherently challenging to control. However, with advances in microprocessors and better physical understanding of the ignition process, HCCI is showing promise in achieving lowered emissions of gasoline engines emissions along with the better efficiency of diesel engines.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a method of controlling homogenous charge compression ignition (HCCI) combustion timing and pressure rise rate. As explained below, use of the method decouples the amount of trapped mass in the engine cylinder from the oxygen concentration of the trapped mass. A constant volume air pump, such as a supercharger, with a bypass valve, controls the mass of oxygen delivered to the cylinder. A turbocharger, which drives a high pressure exhaust gas recirculation (EGR) loop, controls the amount of burned gases delivered to the cylinder. This combination of hardware allows for good control of combustion timing by providing for EGR variations without undue effect from varying oxygen concentration. Additionally, by charging the trapped mass with EGR, the pressure rise rate during combustion can be controlled to adjust combustion noise.

As indicated in the Background, HCCI engines demonstrate significant advantages over current spark ignition and diesel cycle compression ignition engines. HCCI combustion yields low NOx and particulate emissions and high efficiency. However, unlike spark ignition and diesel engines, control of combustion timing is difficult. Additionally, due to rapid reaction rates, HCCI engines can have considerable combustion noise.

Figure 1:
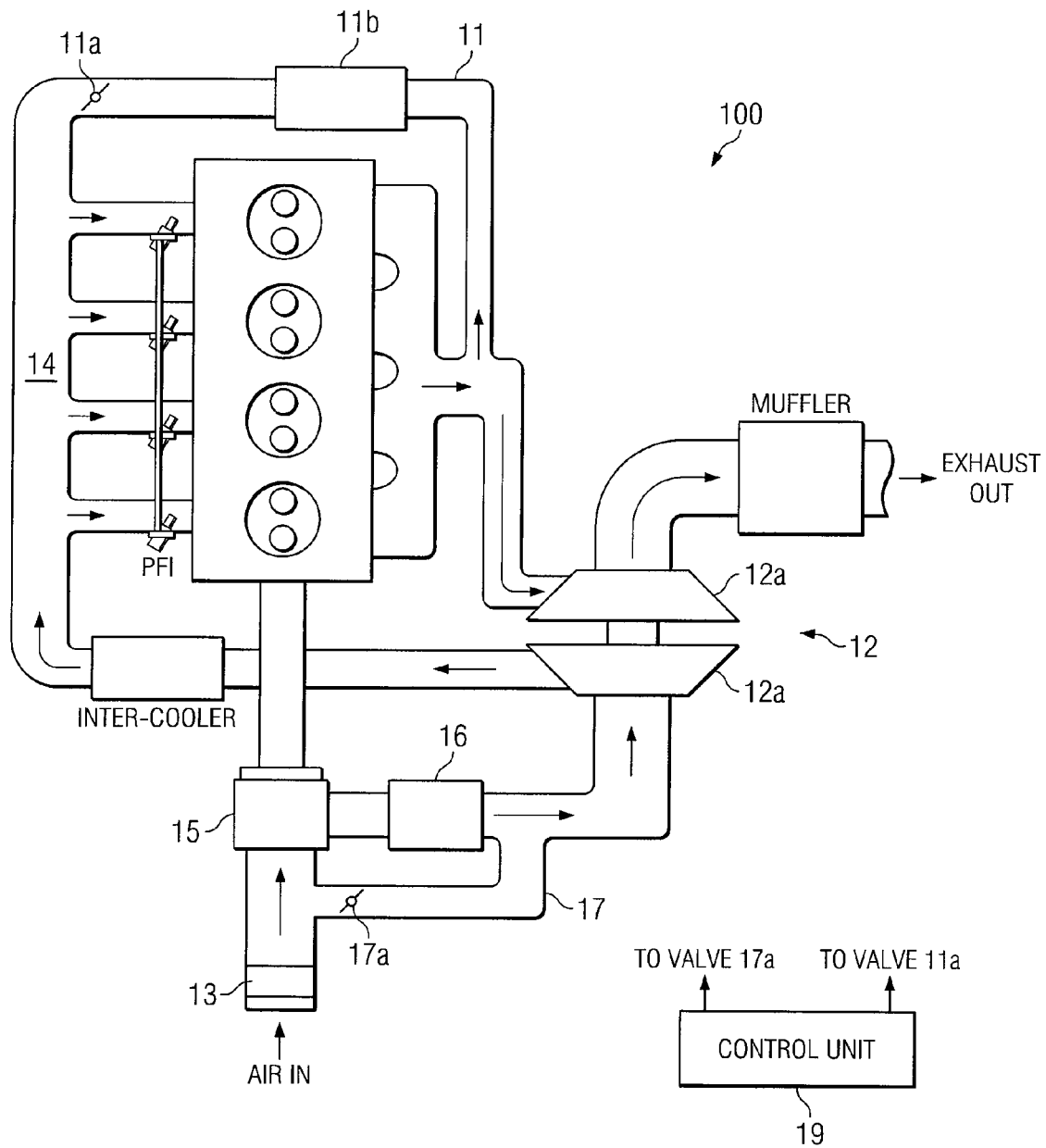
FIG. 1 illustrates one embodiment of an HCCI engine system in accordance with the invention.

FIG. 1 illustrates one embodiment of an HCCI engine system 100 in accordance with the invention. Engine system 100 is equipped with a variable output turbocharger 12, such as a variable geometry turbocharger (VGT) 120.

Engine system 100 also has a high pressure EGR loop 11, which permits exhaust gas to be recirculated from the exhaust manifold back to the air intake side of the manifold of engine system 100. At the intake manifold, the recirculated exhaust is mixed with fresh intake air. An EGR valve 11a (by means of its orifice size) and the turbocharger 12 (by means of its variable geometry and control of the pressure ratio) work in combination to control the amount of EGR that is mixed with the fresh intake air. The recirculated exhaust is typically cooled with an EGR cooler 11b located on the EGR loop.

Fresh air enters the engine block via an air intake port. A mass air flow (MAF) sensor 13 measures the mass of air entering the intake manifold 14. From MAF sensor 13, the air is directed to supercharger 15.

Supercharger 15 may be driven in various ways, but in the example of this description, is belt driven from the engine crankshaft. The air from supercharger 15 goes through a heat exchanger (cooler) 16, and then into the turbocharger compressor 12a. In the example of this description, supercharger 15 is a root-type supercharger, but may be any type of positive displacement air pump such as a root supercharger, a twin screw supercharger, or a variable output supercharger.

A bypass line 17 routes air from the inlet of the turbocharger compressor 12a back to the inlet of supercharger 15. This permits boosted fresh air from the supercharger outlet to be delivered back to the supercharger inlet so that it does not enter the turbocharger compressor 12a. Bypass valve 17a is variable and controllable from open to closed.

As an alternative to using a constant output supercharger and bypass line, a variable output supercharger 15 could be used. It should be understood that for purposes of this invention, a variable output supercharger 15 would be equivalent to supercharger 15 used in combination with bypass line 17 and bypass valve 17a, in that both permit the amount of fresh air from the supercharger to the turbocharger to be controlled.

On the exhaust side of engine 14, the exhaust gases pass through the turbocharger turbine 12b or through the high-pressure EGR loop 11. As is true for other engines that use EGR, for a given load (resulting in a given fuel input), a given ratio of fresh air to recirculated exhaust contributes to optimum combustion of engine 100.

As indicated in the Background, for spark ignited engines, combustion can be controlled by controlling the spark timing.

For diesel engines, combustion can be controlled by controlling the fuel injection. For an HCCI engine, such as engine 100, fuel and air are pre-mixed, then compressed, and ignition occurs when in-cylinder conditions favor combustion.

A feature of system 100 is that the amount of EGR is used to control combustion timing. Specifically, EGR can be used to delay combustion until just after TDC (top dead center) of the cylinder action. In other words, combustion is controlled to occur at a time that is neither too early nor too late for a desired engine performance. However, the addition of EGR is achieved without displacing oxygen from fresh air. This is accomplished by controlling the EGR ratio and pressure, and by using supercharger 15 in combination with bypass valve 17a and turbocharger 12 to independently control fresh air intake. In this manner, control of EGR and fresh air are decoupled, and changes in the EGR ratio do not result in large combustion timing changes.

Control unit 19 has appropriate hardware and software, programmed to perform the control methods described herein. It delivers control signals to EGR valve 11a and bypass valve 17a to control EGR and fresh air, respectively. The inputs to control unit 19 represent various engine operating conditions that determine a desired oxygen content and EGR rate. Control unit 19 is typically part of a comprehensive engine control unit that controls a variety of functions related to engine system 100 in addition to those relevant to this invention.

Figure 2A:
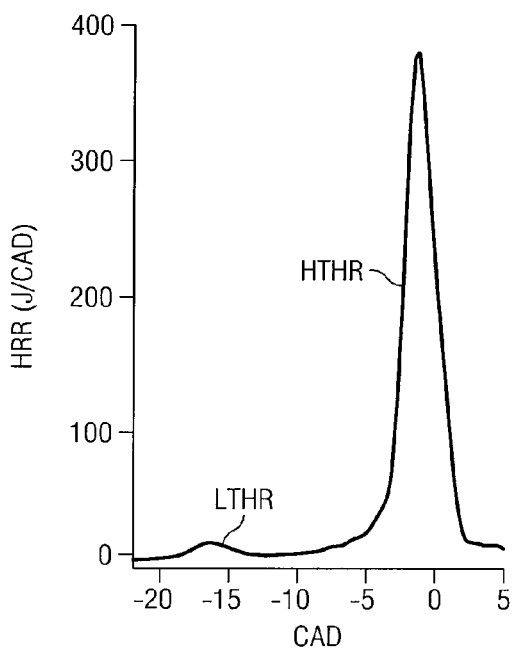
FIGS. 2A, 2B, and 2C illustrate heat release rate (HRR), mass fraction burned (MFB), and in-cylinder bulk gas temperature, respectively, for the HCCI engine system of FIG. 1.
Figure 2B:
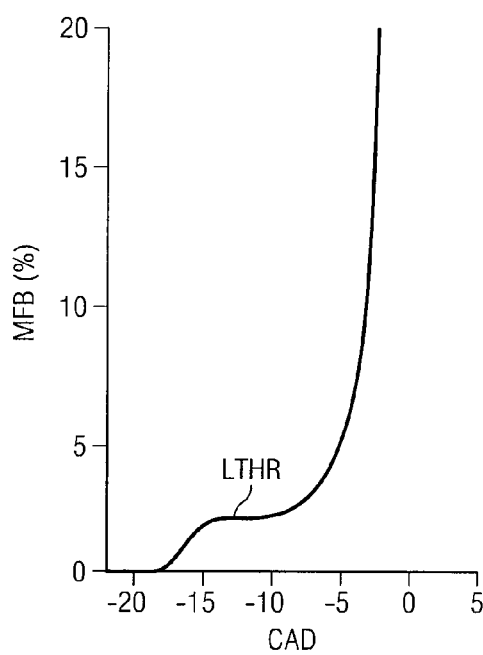
Figure 2C:
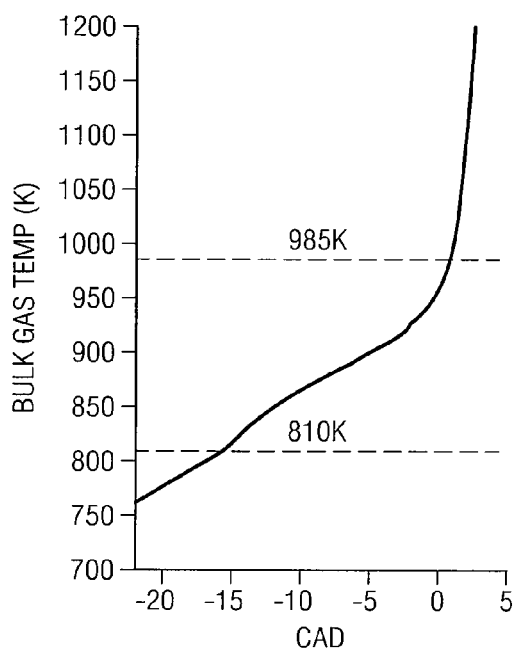

FIGS. 2A, 2B, and 2C illustrate typical plots of the heat release rate (HRR), mass fraction burned (MFB), and in-cylinder bulk gas temperature, respectively, for an HCCI engine system such as engine system 100. These functions are each expressed as a function of crank angle degree (CAD), where TDC is at 0 CAD.

As illustrated in FIGS. 2A and 2B, HCCI combustion is separated into two regions; a low temperature heat release (LTHR) region and a high temperature heat release (HTHR) region. As illustrated in FIG. 2A, for typical HCCI combustion, the LTHR occurs near 20 degrees before top-dead-center (TDC).

The LTHR typically releases between two to twenty percent of the fuel energy depending upon the fuel. In the example of FIG. 2B, about 2.5% of the fuel energy was released during LTHR. The remainder of the heat release occurs during the HTHR. As illustrated in FIG. 2C, the LTHR reactions begin around 800 Kelvin, while the HTHR reactions begin around 1000 Kelvin.

To change the location of the LTHR in the engine cycle, either the inlet air must be heated or a different geometric or effective compression must be used. For most engines these controls are not available or impractical, so the LTHR usually occurs at roughly the same crank angle.

Figure 3:
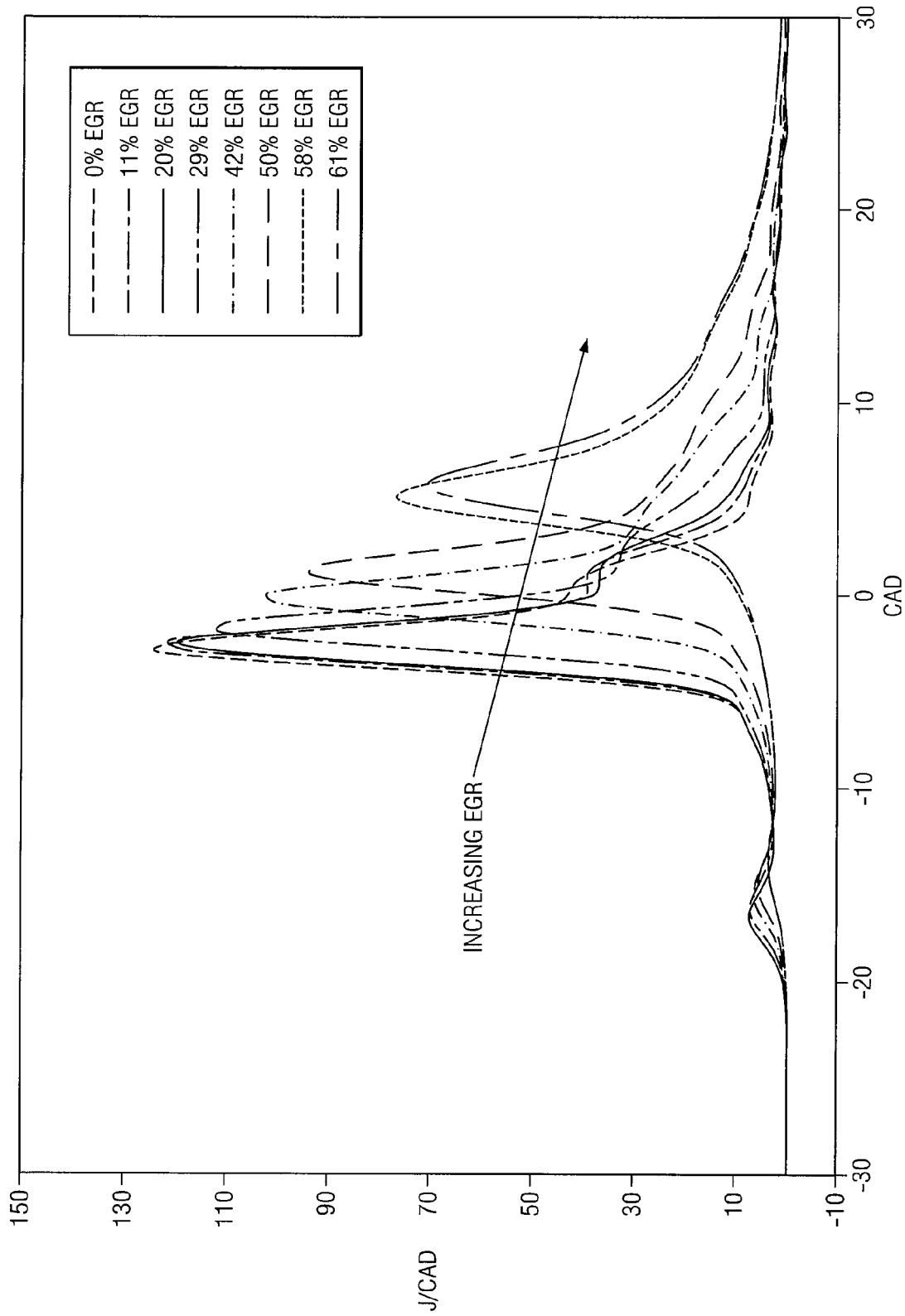
FIG. 3 illustrates the heat release rate at various EGR rates, and shows how combustion timing is delayed when EGR is added and increased.

As illustrated in FIG. 3, the EGR ratio can be used to affect ignition timing. To change the location of the HTHR, EGR is added, which affects the magnitude of the LTHR. With a lesser LTHR magnitude, a lesser temperature change occurs during the LTHR, therefore retarding the crank angle at which 1000 Kelvin occurs, which retards HTHR timing.

FIG. 3 illustrates the filtered heat release rate at various EGR rates, and shows how combustion timing is delayed when EGR is added and increased. The LTHR begins at roughly the same crank angle for all conditions; however, the HTHR is delayed with EGR.

In the absence of the control features of the present invention, the LTHR magnitude, which changes with the oxygen-to-fuel ratio, is very sensitive to the EGR rate. This is particularly true when combustion timing is delayed after TDC. This is because EGR typically displaces fresh air (and therefore oxygen). This not only reduces the mass of oxygen available from the fresh air, but also increases the engine equivalence ratio which reduces the oxygen in the exhaust gas and therefore decreases the oxygen available in the EGR. Because oxygen concentration is such a significant factor in combustion timing, this double effect of EGR for reducing oxygen mass tends to make HCCI combustion timing extremely sensitive to EGR rate, particularly when late combustion timing is desired.

One aspect of the invention is the recognition that if EGR could be added in addition to, instead of in place of, the fresh air, then the sensitivity of combustion timing to EGR rate can be reduced. Referring again to FIG. 1, this can be achieved by using a constant volume pump 15 to regulate the mass of fresh air entering the engine 14. A roots or twin-screw supercharger is a nearly constant volume pump, and works well for this purpose. Additionally, for control of the mass amount of fresh air, bypass valve 17a can be used to deliver air from the supercharger outlet to back to the supercharger inlet.

If supercharger 15 is used to force fresh air into the engine, then any EGR gases are added to the fresh air. This constant volume pump can be used to move fresh air into the engine independent of downstream conditions. In this way, any EGR is added on top of, rather than in place of, fresh air.

Adding EGR without displacing fresh air diminishes the "double effect" of EGR in reducing oxygen in the cylinder. Because combustion timing is no longer as sensitive to the EGR rate, but the EGR rate still affects the total mass in the cylinder, then EGR can be used to control the mass in the cylinder relatively independent of oxygen concentration.

In-cylinder oxygen control can be achieved with the constant volume pump 15 and bypass valve 17a. Using bypass valve 17a, if an oxygen reduction is desired, more air can by bypassed.

Turbocharger 12 and EGR valve 11a are used to control the EGR rate. Since the EGR is added to the fresh air, the EGR rate can be used to control the intake manifold air pressure, and therefore trapped mass, in the cylinder.

If FIG. 3 were modified to reflect use of control unit 19 to provide decoupled EGR and fresh air (oxygen) control, the result would be relatively small changes in combustion timing regardless of the EGR ratio. In other words, the EGR ratio can be varied with less effect on oxygen concentration (and therefore on combustion timing).

Figure 4:
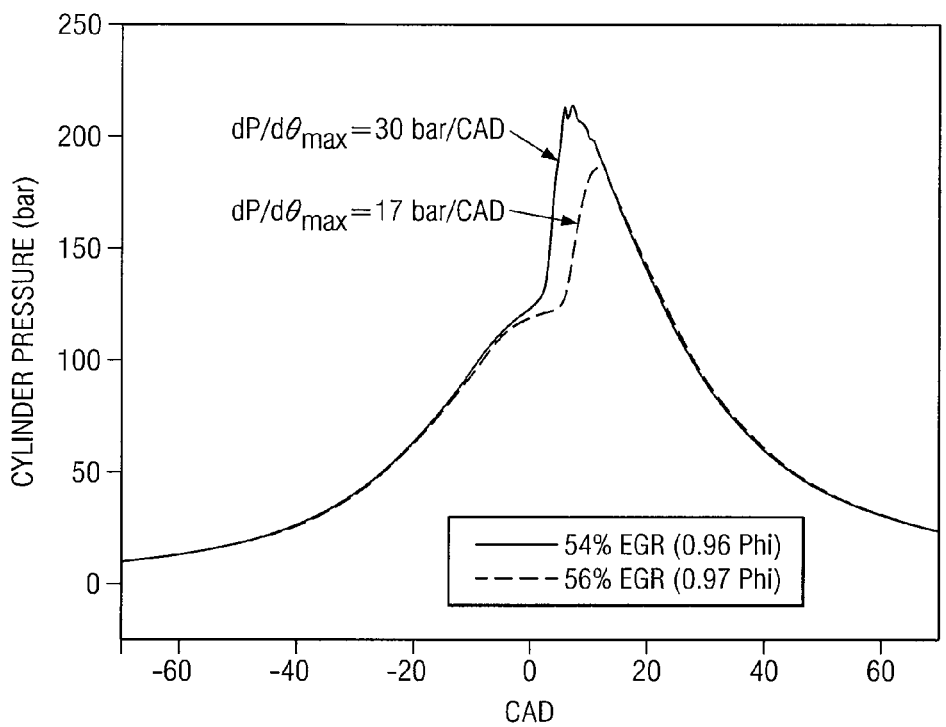
FIG. 4 illustrates how changing the EGR rate from 54% to 56% results in dramatic combustion timing changes.

FIG. 4 illustrates how changing the EGR rate from 540 to 56% affects cylinder pressure. More specifically, FIG. 4 illustrates cylinder pressure as a function of CAD for these two different EGR rates. The maximum rate of pressure rise (MRPR), and also the engine noise, decreased from 30 bar per crank angle to 17 bar per crank angle.

Figure 5:
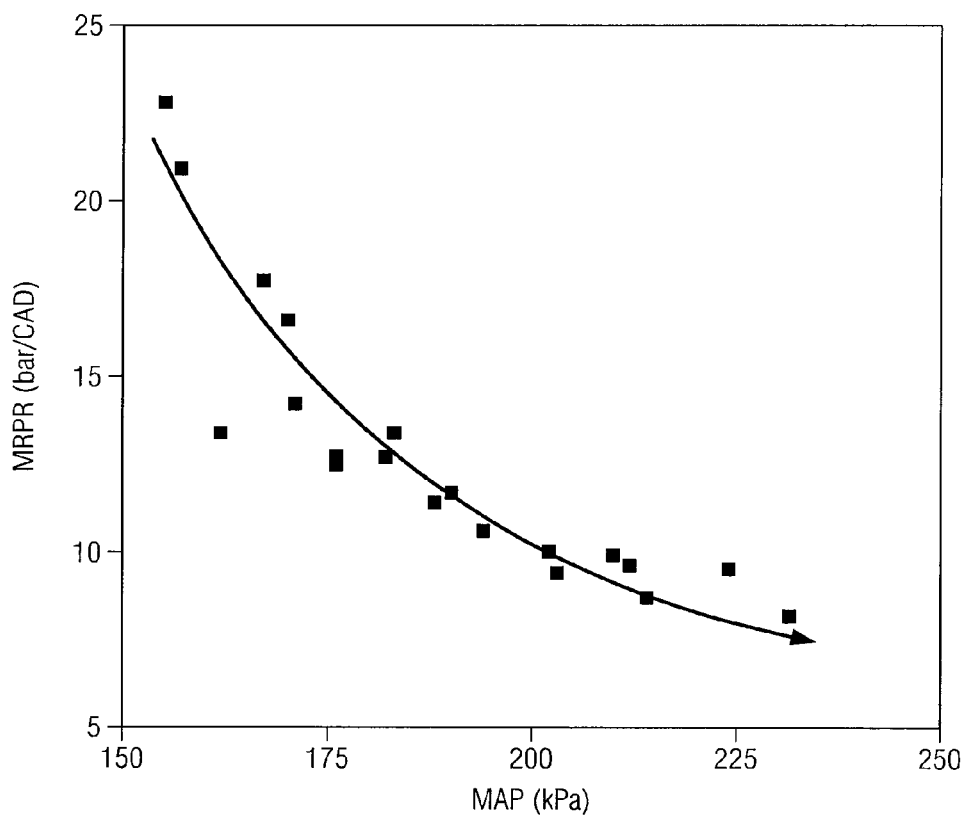
FIG. 5 illustrates the relationship between the maximum rate of pressure rise (MRPR) and intake manifold absolute pressure (MAP).

FIG. 5 illustrates the maximum rate of pressure rise (MRPR) as a function of intake manifold absolute pressure (MAP). Combustion noise is strongly related to MRPR, and trapped mass is a function of the MAP. The MRPR, and therefore combustion noise, is reduced as MAP, and therefore trapped mass, is increased.

In sum, the above-described method decouples in-cylinder oxygen concentration from trapped mass. The result is a mechanical (passive) means of independently controlling HCCI combustion timing and combustion noise. Both the amount of EGR and the amount of fresh air can be separately controlled so that the high temperature heat release can be maintained at a desired time during the cylinder cycle (typically just after TDC). The independent control of fresh air permits changes in the EGR to be achieved without changing ignition timing.

What is claimed is:

1. A method of controlling ignition timing of an HCCI engine, the engine having an intake manifold, an exhaust manifold, a high pressure EGR loop and a turbocharger, the turbocharger having a compressor and turbine, comprising:
    using a constant volume pump to provide an amount of charged fresh air to the compressor;
    controlling an amount of fresh air delivered into the compressor from the constant volume pump;
        wherein the step of controlling an amount of fresh air is performed by providing a bypass line for routing fresh air from upstream the inlet of the compressor to upstream the inlet of the constant volume pump, and by using a valve on the bypass line to control how much fresh air travels through the bypass line;
    using the EGR loop to deliver recirculated exhaust downstream the compressor, thereby providing an amount of recirculated exhaust gas to the engine intake manifold; and
    controlling the amount of recirculated exhaust to the engine intake manifold;
    wherein the step of controlling the amount of recirculated exhaust to the engine intake manifold is performed at least in part by an EGR valve; and
    wherein the steps of controlling the amount of fresh air and of controlling the amount of recirculated exhaust are performed such that a high temperature heat release in the engine cylinders occurs at a predetermined time during the cylinder cycle.

2. The method of claim 1, wherein the high temperature heat release occurs at or near top dead center of the cylinder cycle.

3. The method of claim 1, wherein the constant volume pump is driven by the engine.

4. The method of claim 1, wherein the constant volume pump is a positive displacement supercharger.

5. The method of claim 1, wherein the constant volume pump is a root-type supercharger.

6. The method of claim 1, wherein the constant volume pump is a twin screw supercharger.

7. The method of claim 1, wherein the step of controlling the amount of recirculated exhaust is further performed to control cylinder pressure.

* * * * *